United States Patent [19]

Yamada et al.

[11] Patent Number: 5,394,256
[45] Date of Patent: Feb. 28, 1995

[54] ENCAPSULATED LIQUID CRYSTAL IN LIQUID CRYSTAL MATERIAL WHERE ONE LIQUID CRYSTAL HAS POSITIVE BIREFRINGENCE AND DIELECTRIC ANISOTROPY, THE OTHER HAS ONLY ONE POSITIVE OF BIREFRINGENCE AND DIELECTRIC ANISOTROPY

[75] Inventors: Nobuaki Yamada, Higashiosaka; Toshiyuki Hirai, Tenri; Noriaki Onishi, Osaka; Shuichi Koozaki, Nara, all of Japan

[73] Assignee: Sharp Kabushiki Kaisha, Osaka, Japan

[21] Appl. No.: 968,978

[22] Filed: Oct. 30, 1992

[30] Foreign Application Priority Data

Oct. 30, 1991 [JP] Japan .................. 3-285001

[51] Int. Cl.⁶ .................. G02F 1/13; G02F 1/137
[52] U.S. Cl. .................. 359/51; 359/94; 359/99
[58] Field of Search .................. 359/51, 52, 53, 74, 359/94, 99; 428/1

[56] References Cited

U.S. PATENT DOCUMENTS

| | | | |
|---|---|---|---|
| 4,581,608 | 4/1986 | Aftergut et al. | 359/51 |
| 5,168,380 | 12/1992 | Fergason | 359/51 |
| 5,208,687 | 5/1993 | Yoshida et al. | 359/51 |

FOREIGN PATENT DOCUMENTS

| | | |
|---|---|---|
| 508592 | 10/1992 | European Pat. Off. |
| 525492 | 2/1993 | European Pat. Off. |
| 50-101110 | 8/1975 | Japan |
| 55-046718 | 4/1980 | Japan |
| 1267524 | 10/1985 | Japan |
| 1-285920 | 11/1989 | Japan |
| 3-46621 | 2/1991 | Japan |
| 3-59515 | 3/1991 | Japan |
| 3-72317 | 3/1991 | Japan |
| WO89/09807 | 10/1989 | WIPO |

*Primary Examiner*—Anita Pellman Gross
*Assistant Examiner*—Kenneth Parker
*Attorney, Agent, or Firm*—David G. Conlin; Linda M. Buckley

[57] ABSTRACT

A liquid crystal display comprises transparent electrodes formed on opposite surfaces of a pair of transparent substrates and a liquid crystal layer filled between the transparent substrate, in which the liquid crystal layer is formed of at least two kinds of liquid crystals which are separated each other and provided in the form of a layer in the direction horizontal to the substrate, a first kind of liquid crystal includes at least one kind of liquid crystal (liquid crystal I) showing that dielectric constant anisotropy $\Delta\epsilon > 0$ and refractive index anisotropy $\Delta n > 0$ and a second kind of liquid crystal includes at least one kind of liquid crystal (liquid crystal II) showing that the dielectric constant anisotropy $\Delta\epsilon < 0$ and the refractive index anisotropy $\Delta n > 0$ or liquid crystal (liquid crystal III) showing that the dielectric constant anisotropy $\Delta\epsilon > 0$ and the refractive index anisotropy $\Delta n < 0$.

5 Claims, 2 Drawing Sheets

ENCAPSULATED LIQUID CRYSTAL IN LIQUID CRYSTAL MATERIAL WHERE ONE LIQUID CRYSTAL HAS POSITIVE BIREFRINGENCE AND DIELECTRIC ANISOTROPY, THE OTHER HAS ONLY ONE POSITIVE OF BIREFRINGENCE AND DIELECTRIC ANISOTROPY

BACKGROUND OF THE INVENTION

1. Field of the Invention

The present invention relates to a liquid crystal display.

More particularly, the present invention relates to a liquid crystal display using a display mode which controls scattering of light generated at an interface between liquid crystals by changing a difference in refractive index between different liquid crystals by an external voltage.

2. Description of the Related Art

Conventionally, there has been practically used a twisted nematic (TN) type or a super twisted nematic (STN) type display using a nematic liquid crystal as a display element, in which an electro-optical effect is used. In addition, it has been proposed to use a ferroelectric liquid crystal. These need a polarizing plate and orientation process. Meanwhile, there are a dynamic scattering (DS) effect and a phase change (PC) effect which use scattering of a liquid crystal but do not need the polarizing plate. Recently, there has been proposed a method which electrically controls transparent or white-opaque state using birefringent properties without the polarizing plate and the orientation process. This method is a display mode in which basically, when a voltage is applied, the liquid crystal is uniformly oriented in the direction of an electric field and the transparent state is displayed by matching ordinary refractive index of a liquid crystal molecule to a refractive index of a base polymer medium, and when the voltage is not applied, a light scattering state caused by disorder of the orientation of the liquid crystal molecule is used.

Although there is disclosed a method in National Publication of Translation of PCT Application No. 501631/1983, in which the liquid crystal is contained in a polymeric capsule, since the liquid crystal is an independent closed cell and it is surrounded by polymers, a space between electrodes is not effectively used so that a contrast is low. In addition, a driving voltage causing a change in the liquid crystal orientation is high and the range of utilization is small.

In addition, there is disclosed a method in National Publication of Translation of PCT Application No. 502128/1986, in which the liquid crystal is mixed with a photo-polymerization or a thermoplastic resin and the resin is hardened to precipitate the liquid crystal and then, liquid crystal droplets are formed in the polymer matrix. However, since the above method employs phase separation process, while a method for controlling a diameter of the liquid crystal droplet is disclosed in Japanese Unexamined Patent No. 72317/1991, it is difficult to precisely control the diameter of the liquid crystal droplet.

In addition, there is disclosed a method in Japanese Unexamined Patent No. 59515/1991, in which the liquid crystal is immersed with a polymeric porous film. Since the above method does not use the phase separation process when the liquid crystal droplets are formed, the degree of freedom of selection of applicable resin and liquid crystal is considerably large and the polymeric porous film can be widely employed. However, the liquid crystal droplet can not be sufficiently controlled under the present circumstances.

In addition, there is disclosed a method in Japanese Unexamined Patent No. 46621/1991, which is characterized in having a structure in which a polymer bead of a scattering source of light is dispersed between two transparent electrodes in the liquid crystal. Although intensity of light scattering is high, it is difficult to uniformly scatters the bead, so that the display is not likely to be uniform.

A liquid crystal display element according to the above prior art uses a fact that a difference between refractive indices of basically one kind of liquid crystal material and a polymeric material varies with a change in the external electric field.

It is defined that $n_e$ is a refractive index of extraordinary light and $n_o$ is a refractive index of ordinary light. In the liquid crystal display element using the conventional polymer dispersed mode, when the voltage is not applied, light is scattered using a difference between a refractive index n $(=(n_e+2n_o)/3)$ in a random orientation state of the liquid crystal material and a refractive index $n_p$ of the polymeric material.

When the voltage is applied, the liquid crystal is orientated along the electric field, and then the refractive index of the liquid crystal changes to $n_o$. At that time, when the refractive indices of the liquid crystal and the polymer are selected so as to realize $n_o=n_p$, the liquid crystal cell becomes transparent and then light is not scattered. Thus, the liquid crystal element controls the scattering state of light using a mismatch of the refractive indices of the liquid crystal and the polymer. However, even when the configuration of the liquid crystal droplet is optimized, if the mismatch of the refractive indices of the liquid crystal and the polymer is not sufficiently large, preferable contrast can not be obtained. Meanwhile, it is determined that the degree of the mismatch of the refractive indices of the liquid crystal and the polymer is in proportion to refractive index anisotropy $\Delta n$ $(=n_e-n_o)$ of the liquid crystal material. However, the refractive index anisotropy $\Delta n$ of the actual liquid crystal material is 0.3 at most, which is not sufficient to obtain preferable contrast.

In addition, in order to make a polymer matrix, a volume ratio of a polymer to a liquid crystal component has to be 10% or more. Therefore, utilization of the liquid crystal volume in the cell is relatively low and it is difficult to improve the contrast. At the same time, the (effective) voltage becomes high with increasing the content of polymer, so that the voltage applied to the liquid crystal is lowered. As a result, the liquid crystal is confined in a small space, so that the driving voltage has to be highly set.

Although the contrast of a multi-layer cell formed of two layers can be high, it is necessary to provide a substrate material between the first and second layers to separate them, causing parallax. Furthermore, the multilayer cell needs electrodes, circuits or the like double because the first and second layers are separately driven. As a result, costs and weight are increased.

SUMMARY OF THE INVENTION

The present invention provides a liquid crystal display comprising transparent electrodes formed on surfaces of a pair of opposed transparent substrates and a liquid crystal layer filled between the transparent substrates, in which the liquid crystal layer is formed of at least two kinds of liquid crystals which are separated each other and provided in the form of a layer in the horizontal direction of the substrates, the first kind of liquid crystal includes at least one kind of liquid crystal (liquid crystal I) showing dielectric constant anisotropy $\Delta\epsilon > 0$ and refractive index anisotropy $\Delta n > 0$ and the second kind of liquid crystal includes at least one kind of liquid crystal (liquid crystal II) showing the dielectric constant anisotropy $\Delta\epsilon < 0$ and the refractive index anisotropy $\Delta n > 0$ or liquid crystal (liquid crystal III) showing the dielectric constant anisotropy $\Delta\epsilon > 0$ and the refractive index anisotropy $\Delta n < 0$.

It is preferable that the liquid crystal layers are separated in sea and island combination states and the liquid crystal in the island state is encapsulated in a micro-capsule and it is further preferable that the liquid crystal in the island state is the liquid crystal I and the liquid crystal in the sea state is the liquid crystal II. In addition, it is most preferable that the liquid crystal in the island state is a smectic, nematic or chiral nematic liquid crystal, in which a guest-host type of dichroic dye or pigment is mixed.

Still further, it is preferable that the two liquid crystal layer is separated to upper and lower layers and each liquid crystal layer is a polymer dispersed type liquid crystal and it is also preferable that the upper liquid crystal layer and the lower liquid crystal layer are in an opaque state and in a transparent state when a voltage is not applied and in the transparent state and in a colored state when the voltage is applied, respectively. In addition, it is preferable that the liquid crystal layer is formed of the smectic, nematic or chiral nematic liquid crystal, in which the guest-host type of dichroic dye or pigment is mixed, and it is most preferable that the lower liquid crystal layer is previously oriented by applying the electric field or magnetic field.

At that time, if the, liquid crystal II shows that the dielectric constant anisotropy $\Delta\epsilon < 0$ and the refractive index anisotropy $\Delta n$ is 0.02 to 0.15, it can be effectively used.

DETAILED DESCRIPTION OF THE INVENTION

Figure 1:
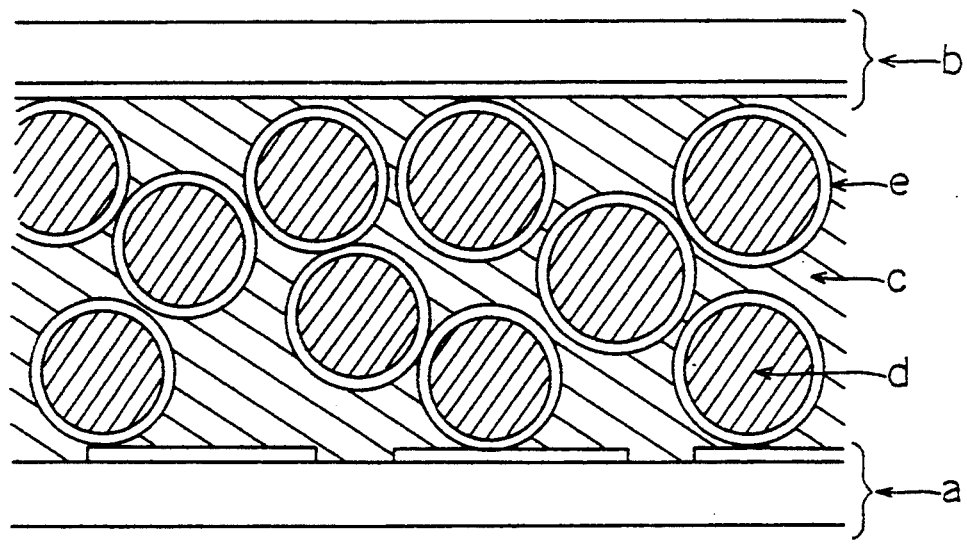
FIG. 1 is a schematic sectional view showing a liquid crystal display element in which micro-capsules having liquid crystals formed of different components are dispersed in a liquid crystal, which is sandwiched by two transparent electrodes.

The inventors of the present invention have studied to increase an apparent mismatch of refractive indices of a liquid crystal and a polymer and as a result, found that an apparent difference in the refractive index of the liquid crystal in the on-off state of the electric field is increased by combining two or more kinds of liquid crystal materials having different properties. Thus, there can be provided a liquid crystal display using an optical dispersion mode having excellent electro-optical characteristics and contrast.

According to the present invention, there is provided a specific liquid crystal display in which two or more kinds of different liquid crystal materials are arranged without being mixed. As one configuration, many kinds of liquid crystal materials exist together in sea and island combination states. More specifically, in order to form the liquid crystal material in the island state, a micro-capsule is preferably used. In addition, there is another configuration in which the liquid crystal materials are separated to upper and lower layers in that case, a polymer dispersed type liquid crystal is preferably employed as a material for separating the liquid crystal materials to two layers.

There are two kinds of combinations of the liquid crystal materials forming the non-mixed state. More specifically, the first combination is a combination of a liquid crystal material showing that the dielectric constant anisotropy $\Delta\epsilon > 0$ and the refractive index anisotropy $\Delta n > 0$ and a liquid crystal material showing that the dielectric constant anisotropy $\Delta\epsilon < 0$ and the refractive index anisotropy $\Delta n > 0$, and the second combination is a combination of a liquid crystal material showing that the dielectric constant anisotropy $\Delta\epsilon > 0$ and the refractive index anisotropy $\Delta n > 0$ and a liquid crystal material showing that the dielectric constant anisotropy $\Delta\epsilon > 0$ and the refractive index anisotropy $\Delta n < 0$.

According to the first combination of the liquid crystals, a reason why the contrast can be improved will be described. Two liquid crystal materials in which one shows that the dielectric constant anisotropy $\Delta\epsilon > 0$ and the refractive index anisotropy $\Delta n > 0$ and another shows that the dielectric constant anisotropy be $\Delta\epsilon < 0$ and the refractive index anisotropy $\Delta n > 0$ are each provided so as not to be mixed with each other using the micro-capsule. In a case where the refractive indices of the two liquid crystal materials and that of the component of the micro-capsule are set so as to be matched to each other at the time of application of the voltage, the liquid crystal changes random orientation when the voltage is not applied and the refractive index of the liquid crystal material becomes a refractive index $n_r$ $(=(n_e+2n_o)/3)$ in the random orientation state.

Meanwhile, since the refractive indices of all materials are almost matched to each other when the voltage is applied, the refractive index of the liquid crystal showing that the dielectric constant anisotropy $\Delta\epsilon < 0$ is $(n_e+n_o)/2$ and that of the liquid crystal showing that the dielectric constant anisotropy $\Delta\epsilon > 0$ is no, which means that they are separated in the opposite directions.

Thus, a considerable variation in refractive index can be used in this display and a display element having a high contrast can be made as compared with the conventional display element using a mismatch of refractive indices of one kind of liquid crystal and a polymeric material.

Alternatively, according to the second combination of one liquid crystal showing that the dielectric constant anisotropy $\Delta\epsilon > 0$ and the refractive index anisotropy $\Delta n > 0$ and another liquid crystal material showing that the dielectric constant anisotropy $\Delta\epsilon > 0$ and the refractive index anisotropy $\Delta n < 0$, the same phenomenon as above is observed because of the same principle as above. As a result, a considerable variation in refractive index can be used and a display element having a high contrast can be made.

This phenomenon in the above first and second combinations can be applied to a case where two or more liquid crystals are provided in the sea and island combination states or a case where they are separated to upper and lower layers. Thus, the considerable variation in refractive index can be used and a display element having a high contrast can be formed in view of the same principle.

As the liquid crystal compound (I) showing that $\Delta\epsilon>0$ and $\Delta n>0$, there are biphenyl, terphenyl, phenylcyclohexane, and diphenylcyclohexane which have a cyano group at the end of a molecule. More specifically, E8, E44, ZLI-3219, ZLI-4792 on the market (made by Merck Co.) are preferably used.

As the liquid crystal compound (II) showing that $\Delta\epsilon<0$ and $\Delta n>0$, ZLI-2806, ZLI-4788-000, ZLI-4850 on the market (made by Merck Co.) which have a functional group having strong polarity such as cyano group at a side chain are preferably used.

In addition, as the liquid crystal compound (III) showing that $\Delta\epsilon>0$ and $n<0$, cholesteric liquid crystal in which a chiral-nematic liquid crystal is added to cholesteric and nematic liquid crystals may be used.

The liquid crystal composition of the present invention can be prepared by mixing the liquid crystal compounds (I), (II), (III) with well-known liquid crystal or composition.

It is usually preferable that the content of the compounds (I), (II), (III) is 5 wt % to 95 wt %. If one of them occupies 95 wt % or more, an effect for improving the contrast is not sufficient.

As far as the effect intended by the present invention is not prevented, various addition agents may be blended in the liquid crystal composition of the present invention. For example, another liquid crystal compound or liquid crystal compatible compound having a fluoroalkyl group at the end, for example a dichroic dye may be blended (normally by 0.01 to 1 wt %), whose example is disclosed in Japanese Unexamined Patent No. 47891/1991.

For example, the dichroic dye is blended as guest in host of the smectic, nematic or chiral nematic liquid crystal. In this case, as an example of the compound of the dichroic dye or pigment, there are G214 and G241 for magenta, a mixture of G282 and G232 for green, G282 and G279 for cyanogen, G205 and G156 for red, G232 and G143 for yellow, and G274 and G277 for blue (made by Nippon Kanko Shikiso lab).

The smectic, nematic or chiral nematic liquid crystal composition serving as the host of the present invention may be the above liquid crystal composition.

For example, these liquid crystal compositions may be selected from ZLI-3367, ZLI-4756/1, ZLI-3521/1, ZLI-4714, ZLI-4113, ZLI-3402/1 (made by Merck Co.) as the quest-host liquid crystal composition of black type.

As a method for separating two or more kinds of liquid crystal material without mixing each other, there are methods using the sea and island combination states disclosed in Japanese Unexamined Patent No. 101110/1975, Japanese Unexamined Patent No. 46718/1980, Japanese Unexamined Patent No. 267524/1989 and Japanese Unexamined Patent No. 2859209/1989. According to the above methods, a micro-capsule in which the first liquid crystal is encapsulated in the polymer is regarded as an island and other liquid crystals are regarded as the sea, and two or more kinds of liquid crystals are mixed and dispersed each other.

A method for forming a micro-capsule of the polymer in which the liquid crystal is encapsulated is, for example an interfacing polymerization method. According to this method, a liquid crystal is dispersed in a solvent which does not dissolve the liquid crystal and thermo-polymerization monomer or photo-polymerization monomer which coagulates on the surface of the liquid crystal droplet is added into the solution. Then, heat or light is applied to polymerize the monomer on the surface of the liquid crystal and separate it from the solvent, whereby the micro-capsule is provided.

As another method for forming the micro-capsule, there are an emulsification coating method in liquid, an orifice method, a phase separation method from an aqueous solution (using simple coacervation and complex coacervation methods), a phase isolation method from an organic solvent (a temperature change method, a poor solvent adding method, a phase separation induced liquid polymer using method, an interfacial condensation method, an interfacial separating method, a drying method in liquid, an interfacing precipitation method, an interfacial hardening react method), a two-dimensional emulsion method, a melting dispersion cooling method (spray solidification granulation and solidification granulation), an inner substance replacement method, a suspension coating method in air (fluids bed method), a static electric coagulation method (a colloid using method and a droplet using method), a spray drying method (spray granulation method), and a high-speed collision method in an air current, which are all well known.

The material of the micro-capsule is preferably a material having a refractive index which is close to a refractive index of the respective liquid crystal when the voltage is applied but largely different from that of the liquid crystal when the voltage is not applied.

More specifically, as the above material, there can be used a monomer which is usually used in suspension polymerization, such as styrene, acrylonitrile, butadiene, vinyl acetate, vinyl chloride, methyl acrylate, or a monomer which is used in photo polymerization, such as a derivative of acrylic acid and ethyl acrylate, more specifically, isobutyl acrylate, stearyl acrylate, lauryl acrylate, isoamyl acrylate, n-stearyl methacrylate, cyclohexyl methacrylate, benzyl methacrylate, 2-phenoxy ethyl methacrylate, bisphenol A dimethacrylate, bisphenol A diacrylate, or a polyfunctional resin for increasing physical strength of a polymer, such as 1,4-butanediol dimethacrylate, 1,6-hexanediol dimethacrylate, trimethylolpropane trimethacrylate, trimethylolpropane triacrylate, tetramethylol methane tetraacrylate, more preferably a resin in which the above monomer is harogenated, especially chlorinated and fluorinated, such as 2,2,3,4,4,4-hexafluorobutyl methacrylate, 2,2,3,4,4,4-hexachlorobuthyl methacrylate, 2,2,3,3,3-tetrafluoropropyl methacrylate, 2,2,3,3,3-tetrafluoropropyl methacrylate, perfluorooctyl ethyl methacrylate, perchlorooctyl ethyl methacrylate, perfluorooctyl ethyl acrylate or perchlorooctyl ethyl acrylate. In addition, as the thermal polymerization monomer, there can be used an epoxy resin represented by glycidyl ether, such as ethylene glycol diglycidyl ether, trimethylol propane triglycidyl ether, 1,6-hexanediol diglycidyl ether, and a urethane resin having an isocyanate group such as xylylene diisocyanate or silicon resin having a double bond containing Si. The above monomers may be used independently or two or more of them may be mixed, or a chlorinated or fluorinated polymer, another polymer such as polyvinyl alcohol, polyethylene glycol, or a natural polymer such as gelatin or oligomer may be mixed therein.

An average inner diameter of the micro-capsule containing the liquid crystal droplets is preferably 2 to 8 μm and more preferably 3 to 5 μm. When the average inner diameter of the micro-capsule is less than 2 μm, the small liquid crystal droplets disperse visible light and degrades light scattering properties when the voltage is not applied. A liquid crystal molecule is not likely to move and increase the driving voltage when the voltage is applied. Contrarily, when the average inner diameter is more than 8 μm, the great part of a liquid crystal cell gap is occupied by the micro-capsule, which lowers shielding properties when the voltage is not applied and also lowers a contrast.

After the micro-capsules containing the liquid crystal droplets are uniformly dispersed in the sea of the liquid crystal, an surface acting agent may be added for stabilization. The surface acting agent is preferably noion excluding an impurity which pollutes the liquid crystal material, such a metal ion, electro-conductive ion or the like. More specifically, the nonionic surface active agent is polyoxyethylene sorbitan monopalmitate, polyoxyethylene sorbitan monostearate, polyoxyethlene sorbitan monooleate, polyoxyethlene sorbitan trioleate or chloride or fluoride of these compound.

Especially, the liquid crystal compound (I) having high-speed electric field response is suitable for the liquid crystal material in the micro-capsule. The liquid crystal outside the micro-capsule can be selected according to the driving voltage of the inner liquid crystal material, and the liquid crystal compound (II) is suitable for that. Further, it is preferable to use the liquid crystals having considerably different compositions. For example, a combination of a liquid crystal having strong cohesion, represented by cyanodiphenyl liquid crystal and a liquid crystal having weak cohesion, represented by fluorine liquid crystal or the like is suitable.

Figure 2:
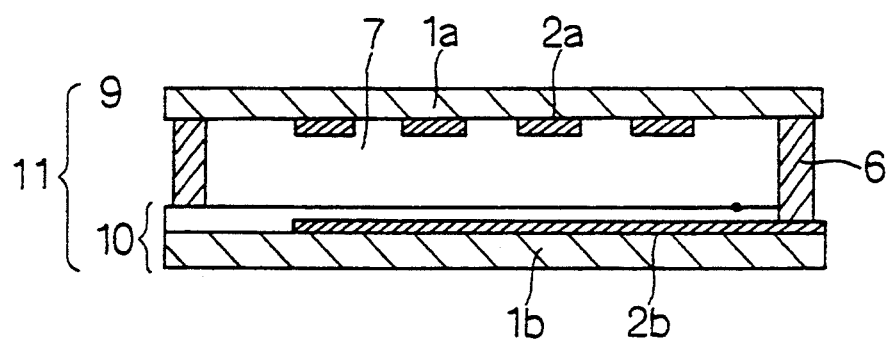
FIG. 2 is a schematic view showing a liquid crystal display.

FIG. 1 shows a sea-island structure in which an island is formed by encapsulating the first liquid crystal d in the thus formed micro-capsule e and the sea is formed by the liquid crystal outside the micro-capsule c and FIG. 2 is an enlarged view of a part of FIG. 1, in which the liquid crystal is filled of FIG. 1, in which reference character a designates a transparent electrode (pixel electrode), reference character b designates a transparent electrode (opposite electrode) and reference character e designates a micro-capsule. As can be seen from FIGS. 1 and 2, both liquid crystal compositions are not further mixed because of the micro-capsule and then they can give their performances independently as the sea and island.

As another configuration, the liquid crystal materials are separated into upper and lower layers by employing a polymer dispersed type liquid crystal as the liquid crystal. For example, the upper layer and/or the lower layer are formed of the polymer dispersed type liquid crystal. The polymer may be polyvinyl alcohol (Tg: 85° C.), polystyrene (Tg: 100° C.), polymethylmethacrylate (Tg: 105° C.), polyacrilic methyl (Tg: 3° C.), polychlorotrifluoroethylene (Tg: 45° C.), polyvinyl acetate (Tg: 29° C.), nitrocellulose (Tg: 53° C.).

A normal method is used for manufacturing the above configuration (referring to National Publication of Translation of PCT Application no. 501631/1983), in which for example, a mixture of the above-described liquid crystal and a monomer is made, the monomer is polymerized by a normal thermal polymerization or photopolymerization and converted to a resin. Then, the liquid crystal is separated from the resin mixture. At this time, the ratio of the liquid crystal to the resin phase is 95:5 to 50:50, preferably 90:10 to 70:30.

in addition, so as to orient previously the liquid crystal molecule in the vertical direction when the voltage is not applied, there is a method in which after a liquid crystal layer is formed, then the electric field and the magnetic field are applied to liquid crystal layer at a temperature higher than Tg of the polymer in use and a method in which the electric field (of a frequency showing $\Delta\epsilon > 0$, for example its minimum peak value is 1 kv/cm or more and maximum peak value is 100 kv/cm or less in a case of the liquid crystal for dual-frequency driving) and the magnetic field (for example 1,000 to 100,000 Gauss) are applied in the vertical direction of liquid crystal layer at a stage during forming the polymer dispersion type liquid crystal display.

In addition, in the above liquid crystal, after the cell is made, since the liquid crystal molecule has to change from the vertical to the horizontal direction when the electric field is applied, the liquid crystal having a frequency showing $\Delta\epsilon < 0$ is preferable. In addition, in the liquid crystal layer for controlling the transparent state and the colored, since clearness of the color is lowered by the scattering of the polymer cell wall, the smaller $\Delta n$ of the liquid crystal is, the more preferable. More specifically, $\Delta n$ is 0.02 to 0.15, preferably 0.04 to 0.1. When $\Delta n$ of the liquid crystal material is 0.02 or less, since $\Delta n$ is too small, it can not be driven at a low voltage. For example, the liquid crystal may be aforementioned ZLI-2806 ($\Delta n$:0.044, $\Delta\epsilon$:—4.8).

An example of a structure of a liquid crystal display according to the present invention will be described in reference to FIG. 2.

A substrate 9 includes a glass substrate 1a and transparent electrodes 2a formed thereon. The plurality of transparent electrodes 2a are arranged in parallel like a stripe.

Meanwhile, a substrate 10 includes a glass substrate 1b and transparent electrodes 2b formed thereon in the same manner as above. The plurality of transparent electrodes 2b are arranged in parallel like a stripe in the same manner as in the substrate 9.

Two or more kinds of liquid crystal compositions 7 are filled between the upper and lower substrates and its thickness (d) is determined according to a design and structure of the liquid crystal display, which is approximately 5.0 to 18.0 μm, preferably 10 to 15 μm. When the thickness is 5 μm or less, light scattering properties is low when the voltage is not applied. Contrarily, when it is 18 μm or more, a predetermined intensity of the electric field for driving the liquid crystal is not sufficient, so that enough transparency can not be obtained when the voltage is applied or the driving voltage is increased. When the driving voltage is increased, electric power consumption is increased and a driving circuit such as an FET has to be improved.

A simple matrix or an active matrix (for example, thin film transistor modified index method) or the like is suitable for a method for driving the liquid crystal display of the present invention. As one example, a polymer dispersed type liquid crystal material showing $\Delta n > 0$ is used as the liquid crystal of the upper layer and a polymer dispersed type liquid crystal material containing a dichroic dye or pigment is used as the liquid crystal of the lower layer, and a voltage of, for example 20 V is applied. Then, the liquid crystal of the upper layer is scattered and becomes opaque when the voltage is off, but it is oriented and becomes transparent when the voltage is on. Meanwhile, the liquid crystal of the lower layer is transparent and its contrast is improved when the voltage is off. More specifically, since the liquid crystal molecule is vertically oriented, the dichroic dye or pigment orients such an arrangement that a molecule of light is not likely to be absorbed. The molecule is disordered and the liquid crystal becomes to the colored state when the voltage is on.

Thus, since the liquid crystal of the upper layer controls the scattering state and the transparent state and the liquid crystal of the lower layer controls the transparent state and the colored state, when they are employed in a direct view type liquid crystal display, the contrast can be especially very effectively improved.

EXAMPLE

Example 1

First, 40 g of a nematic liquid crystal (ZLI-3219 made by Merck Co.) showing that dielectric constant anisotropy $\Delta\epsilon = 13.2$ (>0) and refractive index anisotropy $\Delta n = 0.205$ (>0), 18 g of ethyl acetate, and 4.5 g of a compound (Takenate D-110 N made by Takeda Chemical Industries, Ltd.) of 3 mol of xylenediisocyanate and 1 mol of trimethylolpropane were added so as to prepare an oil soluble uniform solution, and it was kept at the room temperature. Then, 3 cc of aqueous solution in which dodecylbenzenesulfonsoda was contained by 5% was added as a surface active agent into 90 g of aqueous solution in which polyvinyl alcohol was contained by 4% and it was kept at the room temperature. The oil soluble uniform solution was added in the aqueous solution and it was emulsified by a homogenizer at the room temperature. Thus, emulsion in which an average particle diameter was approximately 7 μm was provided. Then, 20.3 g of aqueous solution in which diethylenetriamine was contained by 5% was gradually added dropwise in the emulsion 10 minutes after the emulsion was prepared. Then, it was stirred in a constant temperature bath at 60° C. for 3 hours and then encapsulation was completed. The solvent of the capsule diffused solution was gradually evaporated and washed in water and ethyl alcohol. Thus, an encapsulized liquid crystal having an average particle diameter of about 3.8 μm was provided.

Then, 1 g of the above encapsulized liquid crystal and 0.1 g of trimethylolpropane trimethacrylate were dispersed in 20 g of toluene and then after air dried, applied to a glass attached with ITO (a mixture of indium oxide and tin oxide) (flint glass attached with ITO-500 made by Nippon Sheet Glass Co. Ltd.) so that a thickness may be about 10 μm. Then, it was allowed to stand in nitrogen and another electrode was covered thereon. After toluene was completely evaporated, ultraviolet rays were applied by a high pressure mercury lamp 40 mV/cm$^2$ (365 nm wave length) for two minutes to provide a liquid crystal combination of sea and island type. The liquid crystal forming island was a chiral nematic liquid crystal which was made from the nematic liquid crystal ZLI-3219 (made by Merck Co.) by adding with 5 wt % of a chiral agent S-811 (made. by Merck Co.), formed a microcapsule by a porous capsule and showed the dielectric constant anisotropy $\Delta\epsilon = 13.2$ (>0) and the refractive index anisotropy $\Delta n = -0.106$ (<0). Thus, a liquid crystal cell was formed by the island of the above nematic liquid crystal and the sea of the aforesaid nematic liquid crystal. The schematic sectional view of the thus formed cell was shown in FIG. 1.

The electro-optical characteristic of the above cell was as follows. That is, when the light transmission was a value obtained by subtracting light transmission To when the voltage was not applied from saturated transmission Ts when the voltage was overly applied, the applied voltage (threshold voltage) Vth when the light transmission rose 10% was 3.5 V, and the light transmission was 0.8% when the voltage was not applied and 82.4% when an AC voltage of 50 V was applied, whereby preferable contrast was obtained.

Comparative Example 1

A cell was formed by the same method as in the example 1 and the liquid crystal outside the micro-capsule had the same composition as that of the liquid crystal in the micro-capsule.

The electro-optical characteristic of the above cell was as follows. That is, when the light transmission was a value obtained by subtracting the light transmission To when the voltage was not applied from the saturated transmission Ts when the voltage was overly applied, the applied voltage (threshold voltage) Vth when the light transmission rose 10% was 4.2 V, and the saturated voltage Vs was 8.8 V. In addition, straight transmission (collection angle was 6°) was 3.6% when the voltage was not applied and 81.8% when an AC voltage of 50 V was applied.

Example 2

A cell was formed by the same method as in the example 1 and the liquid crystal (ZLI-2806 made by Merck Co.) showing that the dielectric constant anisotropy $\Delta\epsilon = -4.8$ (<0) and the refractive index anisotropy $\Delta n = 0.044$ (>0) was poured as the liquid crystal outside the micro-capsule.

The electro-optical characteristic of the above cell was as follows. That is, when the light transmission was a value obtained by subtracting the light transmission To when the voltage was not applied from the saturated transmission Ts when the voltage was overly applied, the applied voltage (threshold voltage) Vth when the light transmission rose 10% was 5.2 V, and the saturated voltage Vs was 10.2 V. In addition, the straight transmission (converging angle was 6°) was 0.5% when the voltage was not applied and 82.3% when an AC voltage of 50 V was applied.

Example 3, Comparative Example 2,3

Micro-capsules having an average diameter of 1.2 μm (comparative example 2), 6.8 μm (comparative example 3), and 12.1 μm (comparative example 3) were formed by the method shown in the example 1, while the number of rotation and rotating time of the homogenizer were adjusted. A cell gap was 13 μm. Data of the electro-optical characteristic at that time was shown in the following table 1.

TABLE 1

| | Comp. Ex. 2 | Example 1 | Example 3 | Comp. Ex. 3 |
|---|---|---|---|---|
| Threshold Voltage Vth(V) | 19.1 | 3.5 | 4.5 | 4.2 |
| Saturated Voltage Vs(v) | 31.6 | 9.5 | 10.1 | 12.6 |
| Straight Transmission | | | | |
| T0 (0 V):(%) | 9.2 | 0.8 | 0.6 | 12.9 |
| T50 (50 V):(%) | 83.0 | 82.4 | 82.1 | 82.4 |

Example 4

First, 1 g of fluorine nematic liquid crystal (ZLI-4792) showing that the dielectric constant anisotropy $\Delta\epsilon=5.2$ (>0) and the refractive index anisotropy $\Delta n=0.094$ (>0), 1 g of cholesteric liquid crystal (obtained by adding a chiral nematic liquid crystal S-811 made by Merck Co. to ZLI-3219 made by Merck Co. by 5%) showing that the dielectric constant anisotropy $\Delta\epsilon=13.2$ (>0) and the refractive index anisotropy $\Delta n=-0.106$ (<0) and 0.02 g of polyoxyethylene sorbitan monostearate were mixed by a homogenizer and the mixture was poured in the cell having a cell gap of 12 $\mu$m. Thus, the cell was provided.

The electro-optical characteristic of the above cell was as follows. That is, when the light transmission was a value obtained by subtracting the light transmission To when the voltage was not applied from the saturated transmission Ts when the voltage was overly applied, the applied voltage (threshold voltage) Vth when the light transmission rose 10% was 3.2 V, and the saturated voltage Vs was 7.5 V. In addition, the straight transmission (collection angle was 6°) was 0.5% when the voltage was not applied and 83.7% when an AC voltage of 50 V was applied.

Example 5

First, 1 g of a liquid crystal (ZLI-2806 made by Merck Co. and its magnetic susceptibility $\Delta\chi>0$) showing that the dielectric constant anisotropy $\Delta\epsilon=-4.8$ (<0) and the refractive index anisotropy $\Delta n=0.044$ (>0), 0.03 g of dicthroic dye (S-301 made by Mitsui Toatsu Co.), 18 g of ethyl acetate and 4.5 g of a compound (Takenate D-110N made by Takeda Chemical Industries, Ltd.) of 3 mol of xylenediisocyanate and 1 mol of trimethylolpropane were added to prepare an oil soluble uniform solution and it was kept at the room temperature. Then, 3 cc of aqueous solution in which dodecylbenzenesulfonsoda was contained by 5% was added as a surface active agent into 90 g of aqueous solution in which polyvinyl alcohol (Tg: 85° C.) was contained by 4% and it was kept at the room temperature. The oil soluble uniform solution was added into the aqueous solution and it was emulsified by the homogenizer at the room temperature. Thus, emulsion in which an average particle diameter was approximately 5 $\mu$m was provided. Then, 20.3 g of aqueous solution in which diethylenetriamine was contained by 5% was gradually added dropwise in the emulsion 10 minutes after the emulsion was prepared. Then, it was stirred in the constant temperature at 60° C. bath for 3 hours and then encapsulation was completed. The solvent of the capsule dispersed solution was gradually evaporated and washed in water and ethyl alcohol. Thus, an encapsulized liquid crystal having an average particle diameter of 3.8 $\mu$m was provided.

Figure 3:
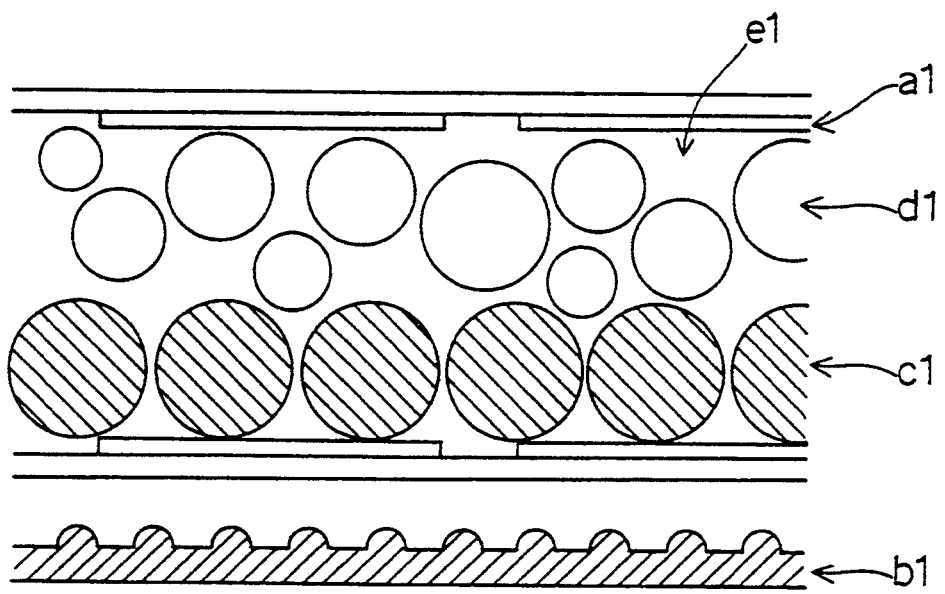
FIG. 3 is a schematic sectional view showing a two-layer liquid crystal element according to an embodiment of the present invention.

Then, 1 g of the above encapsulized liquid crystal, 0.1 g of trimethylolpropane trimethacrylate and 0.05 g of plastic bead having a diameter of 15 $\mu$m (Micropearl Sekisui Fine Chemical Co. Ltd.) were diffused in 20 g of toluene and then after air dried, applied to a glass attached with ITO (indium-tin oxide) (flint glass attached with ITO-500 angstrom made by Nippon Sheet Glass Co. Ltd.) so that a thickness might be 10 $\mu$m. Then, it was allowed to stand in nitrogen and after toluene was completely evaporated, it was irradiated with ultraviolet rays by a high pressure mercury lamp 40 mW/cm$^2$ for two minutes to fix the micro-capsules on the electrode. The magnetic field of 20000 Gauss was applied to the fixed substrate in the direction perpendicular to the substrate surface at 90° C. and the substrate was allowed to stand for ten minutes. Thereafter, the glass substrate attached with ITO was covered to form a cell. Then, a mixture of 0.8 g of nematic liquid crystal (E-8 made by Merck Co., showing that $\Delta n=0.25$ and $\Delta\epsilon=13$), 0.16 g of lauryl acrylate, 0.04 g of trimethylolpropane triacrylate, 0.03 g of a photo initiator (Irugacure 184 made by Chiba Geige Co. Ltd.) was poured in the uniform state to make a polymer diffusion type liquid crystal by a high pressure mercury lamp (45 mW/cm$^2$). Then a glass substrate having a aluminum film having irregular surface was put on the back surface of the above liquid crystal cell. Thus, a multilayer liquid crystal cell was formed. The schematic sectional view of the above liquid crystal cell was shown in FIG. 3.

In the liquid crystal cell, reference numeral a1 designates a pixel electrode, reference numeral b1 designates a reflector, reference numeral c1 designates a microcapsule containing a dichroic dye or pigment, reference numeral d1 designates a polymer diffusion type liquid crystal layer, and reference numeral e1 designates a polymer.

The electro-optical characteristic of the above liquid crystal cell was provided as follows. That is, light was applied to the liquid crystal cell in the vertical direction and reflected light was measured at an angle of 30° from the vertical direction and a ratio of reflected light volume Ao when the voltage was applied to saturated light volume As in which the reflected light of the liquid crystal cell was saturated was measured as a contrast. Its result was shown in a table 2.

Comparative Example 4

A liquid crystal element having only a liquid crystal layer containing a dichroic dye or pigment was formed by the same method shown in the example 5. A thickness of the liquid crystal cell was 5 $\mu$m and a reflector was set in the same manner as in the example 5.

Electro-optical characteristic of the above liquid crystal was shown in the following table 2.

TABLE 2

|  | Example 5 | Comparative Example 4 |
|---|---|---|
| Contrast | 11 | 4 |

A liquid crystal display system according to the present invention can increase brightness of a projection type display using high contrast and possibly implements a direct view type display which can not be implemented in a polymer dispersed type display.

In addition, the liquid crystal display system of the present invention is a direct view reflection type, which attains high contrast and supplies a high contrast type of direct view type portable display which saves electric power consumption, and possibly implements an electro-active sheet display.

For example, the liquid crystal display can be employed in a projection television, a planar display such as a personal computer, or a sign-board, a window, a door, a wall or the like using a shutter effect. Especially, the planer display can be used for a direct view type display whose electric power consumption is low and which saves space because a back light is not necessary.

While only certain presently preferred embodiments have been described in detail, as will be apparent with those skilled in the art, certain changes and modifications can be made without departing from the scope of the invention as defined by the following claims.

What is claimed is:

1. A liquid crystal display comprising:
transparent electrodes formed on opposite surfaces of a pair of transparent substrates and a liquid crystal layer filled between said transparent substrate; in which the liquid crystal layer is formed of at least two kinds of liquid crystals which are separated from each other and provided in the form of a layer in the direction horizontal to the substrate, a first kind of liquid crystal includes at least one kind of liquid crystal (liquid crystal I) showing dielectric constant anisotropy $\Delta\epsilon > 0$ and refractive index anisotropy $\Delta n > 0$ and a second kind of liquid crystal includes at least one kind of liquid crystal (liquid crystal II) showing the dielectric constant anisotropy $\Delta\epsilon < 0$ and the refractive index anisotropy $\Delta n > 0$ or liquid crystal (liquid crystal III) showing the dielectric constant anisotropy $\Delta\epsilon > 0$ and the refractive index anisotropy $\Delta n < 0$, wherein one kind of liquid crystal is encapsulated in a micro-capsule, the micro-capsule being disposed in the other liquid crystal.

2. A liquid crystal display according to claim 1, in which the encapsulated liquid crystal is the liquid crystal I and the other liquid crystal is the liquid crystal II.

3. A liquid crystal display according to claim 1, in which the encapsulated liquid crystal is a smectic, nematic or chiral nematic liquid crystal to which a guest-host type of dichroic dye or pigment is mixed.

4. A liquid crystal display according to claim 1, in which the encapsulated liquid crystal layer is previously oriented by applying an electric field or magnetic field.

5. A liquid crystal display according to claim 1, in which the liquid crystal II shows that the dielectric constant anisotropy $\Delta\epsilon$ is less than 0 and refractive index anisotropy n is 0.02 to 0.15.

* * * * *